Figure 1:
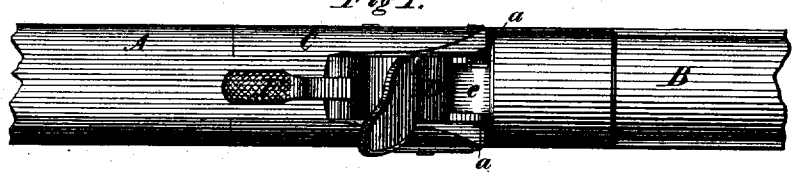

2 Sheets--Sheet 1.

J. RIDER.

Breech-Loading Fire-Arms.

No. 5,213. Reissued Dec. 31, 1872.

*Witnesses.*

Harry King.

H. W. Dodge.

*Inventor.*

Joseph Rider
by Dodgeson
attys

THE NORRIS PETERS CO., PHOTO-LITHO., WASHINGTON, D. C.

J. RIDER.

Breech-Loading Fire-Arms.

No. 5,213. Reissued Dec. 31, 1872.

Witnesses.

Harry King.

H. H. Dodge.

Inventor.

Joseph Rider, by Dodgeson,

Attys.

THE NORRIS PETERS CO., PHOTO-LITHO., WASHINGTON, D. C.

UNITED STATES PATENT OFFICE.

JOSEPH RIDER, OF NEWARK, OHIO, ASSIGNOR TO HIMSELF AND E. REMINGTON AND SONS, OF ILION, NEW YORK.

IMPROVEMENT IN BREECH-LOADING FIRE-ARMS.

Specification forming part of Letters Patent No. 74,428, dated February 11, 1868; reissue No. 5,213, dated December 31, 1872.

*To all whom it may concern:*

Be it known that I, JOSEPH RIDER, of Newark, in the county of Licking and State of Ohio, have invented certain new and useful Improvements in Breech-Loading Guns; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention consists, first, in a self-adjusting spring, in combination with a groove and abutment in the swinging breech-block, to throw open the breech when the brace is removed, and readily find its place when the breech is replaced after having been removed. My invention further consists in hanging the hammer on two centers and giving it its motions partially from one and partially from the other. My invention further consists in hanging the hammer to the brace that holds the breech-block closed, and at a point in rear of the center of motion of said brace. My invention further consists in combining, with the hammer and the locking-brace, a dog or catch for the purpose of operating the brace through the hammer, so as to unlock the breech by the backward movement of the hammer, but which dog or catch is disengaged by the opening movement of the breech, so as to permit the automatic locking of the same when closed. My invention further consists in the combination of the hinged tail-piece on the hammer with the brace and with the trigger for moving and setting said parts. My invention further consists in a device to hold the pivot-bolts of the hammer and breech-block in place. My invention further consists in providing a mainspring-stop to receive and hold the free end of the mainspring when the hammer is removed from the frame.

To enable others skilled in the art to make and use my invention, I will proceed to describe the same with reference to the drawing.

Figure 2:
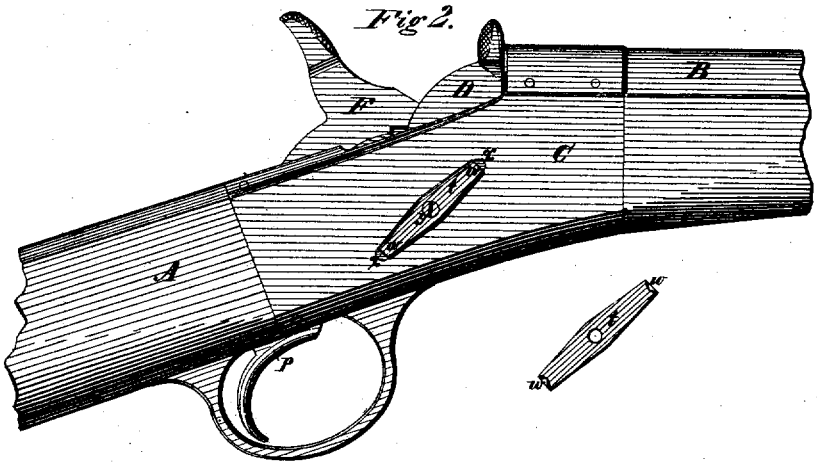
Figure 3:
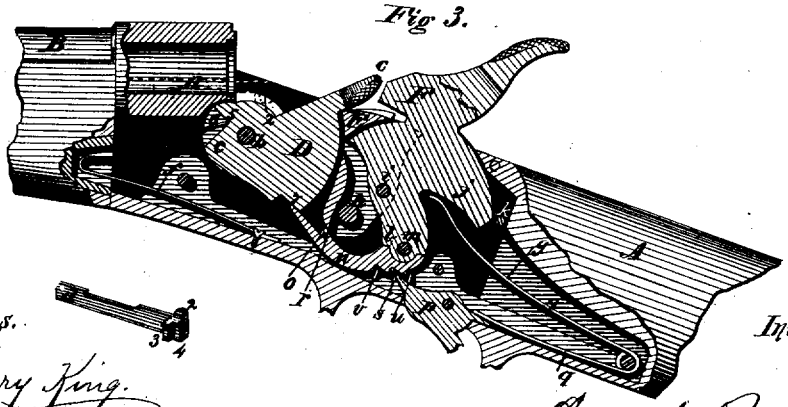
Figure 4:
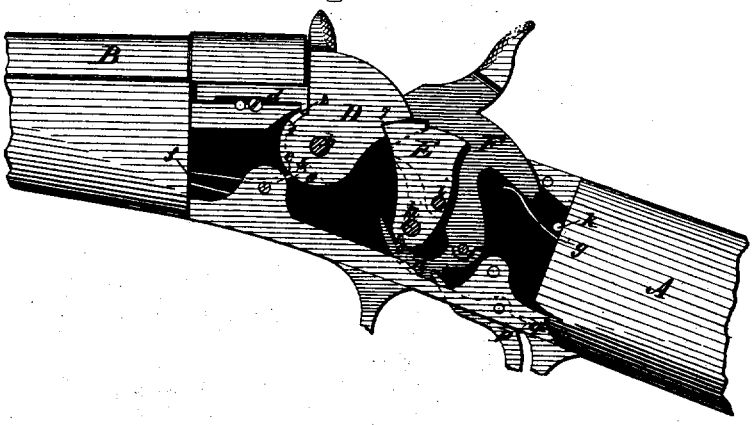
Figure 5:
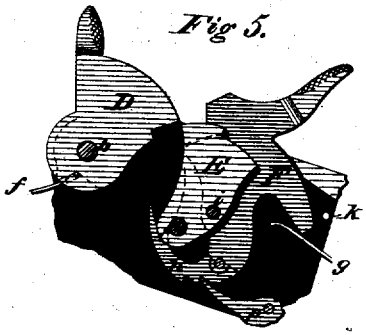

Figure 1 represents a top-plan view of so much of a fire-arm as will illustrate my invention. Fig. 2 represents a view of one of the sides thereof. Fig. 3 represents a view from one of the sides, with a portion broken away so as to show the interior. Fig. 4 represents a side view with the plate removed, and showing the breech closed. Fig. 5 represents a side view with the plate removed, and showing the breech closed and the hammer at half-cock.

A represents the stock, B the barrel, and C the frame, of a fire-arm, to which my several improvements are added, and which I shall refer to in the order in which they are enumerated as nearly as possible. The breech-block D is pivoted to the frame or arm at *b*, and has a lever or thumb-piece, *c*, projecting upward, by which it may be closed, it being, in this case, made self-opening by the action of the spring *f*. Should this spring fail to throw back the breech it can be depressed by the thumb-piece *c*. On one side of this breech-block there is a groove and shoulder, 1, in which a projection, 2, on the cartridge-shell extractor extends, the location of the shoulders 1 and 2 being such that the breech-block may have some motion backward and rearward before the shoulder 1 takes against said projection 2 and commences to move the extractor and throw out the empty shell. The forward portion *d* of the extractor slides in and is guided by a groove in the barrel, so that the movement of said extractor is rectilinear and parallel with the chamber, although deriving its motion from a swinging breech-piece. The extractor (as shown in the separate drawing of it below, Fig. 3) has two curved projections or shoulders, 3 4, upon it—one to catch against the barrel when it is moved clear up, and the other to receive the flange of the cartridge, and by which the cartridge-shell is afterward thrown out. The cartridge is inserted by the fingers until the flange comes against the shoulder of the extractor, and then the closing of the breech-block carries both into their proper places. The hub *e* of the breech-block is rounded out or made concave so as to correspond with the rounded portion of the under part of the barrel, and serves as a guide for inserting the cartridge, which is thus more easily loaded, inasmuch as it opens out a clear loading space, and brings said hub or guide close to the line of the bore of the gun. In the concave or rounded portion *e* of the hub of the breech-block there is an abutment or stop, 5, against which the end 6 of the spring *f* takes when the breech-block is closed up against the end of the barrel or cartridge-chamber, said closing up contracting said spring, as shown in Fig. 4; and when the brace that locks and holds the breech-block is drawn away from it the recoil or reaction of the spring throws back the breech-block, and leaves the arm ready to be reloaded. In case of the failure of the spring *f* to throw the breech-block back, or in case it should be desired, for any reason, to construct the arm without this spring, the breech-block may be readily operated, both in opening and closing, by means of the thumb-piece *c*. This spring *f* I have called a self-adjusting spring, for the reason that when the pivot-bolt is taken out and the breech-block removed, for cleaning or any other purpose, and put back again in its place, the spring finds its position and place in the groove or rounded portion of the hub, and the stop or abutment 5 will catch properly against it, when the breech-block is moved on its pin, without any attention or manipulation on the part of the user or person cleansing or repairing the arm. E is the brace for locking and unlocking the breech-piece D, said brace being thrown under the breech-block, and into or against the shoulder 7 therein or thereon, by the action of the mainspring *g*, as will be hereafter explained. The brace is pivoted to the frame by the pivot-bolt *h*, and the hammer F is pivoted to the brace at *i*. Now, as the brace and hammer sometimes move together and sometimes independent of each other, the hammer swings or moves on two centers, viz., *h* and *i*, as follows: When the hammer and brace move together then the pin *h* is the center of motion of both; but when they move independent of each other then the pin *i* is the center of motion of the hammer, and *h* always the center of motion of the brace. The pin *i* is in rear of a vertical line drawn through pin *h*. The mainspring *g* bears underneath a rearward projection, *j*, on the hammer; and *k* is a mainspring-stop, which prevents the free end 8 of the spring from moving beyond it when, for any purpose, the hammer and brace are removed from the arm. When the breech-block is removed and the trigger withdrawn from its notch in the tumbler the hammer is permitted to drop over forward, the mainspring being held by the stop *k*, and not permitted to press against the hammer, when the latter can be removed without difficulty; and in like manner it can be replaced with perfect ease, the mainspring offering no resistance or obstacle whatever. This holding of the end of the mainspring permits the hammer to be removed from the frame and replaced through the opening in the top of the frame, thereby avoiding the necessity of stripping the entire gun and taking out the guard-strap. There are many ways of arranging this stop without diminishing its usefulness, it being merely necessary that a shoulder or stop be provided, in such position that the mainspring, when resting against it, will be in a position to take underneath the shoulder of the hammer when the hammer is inserted; and by thus using a mainspring-stop the hammer is readily taken out and set back in its place, the pivot-bolt put in, and in cocking the hammer the spring comes of itself into action without any care, attention, or manipulation of the user further than to draw back the hammer.

To a projecting portion, *l*, of the hammer there is pivoted, as at *m*, a dog, *n*; and a notch or projection, *o*, on the upper side of the dog takes against a shoulder, *r*, on the under side of the brace at a certain stage of their action, so that when in that condition and the hammer is drawn back this dog and its catch cause the brace to move back with the hammer; and so soon as the brace clears the breech-block the recoil of the spring *f* throws it back and leaves the barrel open, the shell being thrown out by the flying back of the breech-block, and at about the last of the rearward and downward motion of the breech-block it strikes against the point of the dog *n* and disconnects it from said brace. The several parts will remain in the position shown in Fig. 3, which is the recharging position, until the breech-block is swung shut by the fingers; and the moment it is up against the barrel the reaction of the mainspring *g*, through the hammer F, forces the brace E in, under, and against the breech-block, and locks it there. In this position, the dog *n* being still disconnected from the brace, the hammer is free to be drawn back until the point *s* of the trigger *p* takes into the full-cock notch *u* in the dog *n*. The trigger-spring *q* causes the trigger to bear up against the dog *n*, and this keeps the dog in position to catch against the brace at the proper time. When the hammer has fallen, and the trigger is released, the dog again takes against the brace, so that the moving of the hammer backward again draws back the brace, and the breech-block again flies back or open. Two of the motions are made by the operator, and the other two are automatic, viz: The operator draws back the hammer and brings up or forward the breech-block, the two springs, *f g*, (the latter being the mainspring,) throw back the breech-block, and throw in the brace to lock it when moved up by the hand. A safety-notch, *v*, is provided in advance of the half-cock notch, so that if, after the breech is opened, the hammer is disengaged from the half-cock notch it will catch and hold in the notch *v* instead of falling on the firing-pin when the breech is closed. It is obviously immaterial as to the special arrangement of these devices so long as they are made to operate in such a manner as to lock and unlock the breech-block by the movements of the parts, as described.

It has been the practice heretofore to secure the brace and breech-pins *b h* in place by screws tapped into the outside of the frame, as shown in my patent No. 45,797, issued January 3, 1865. This plan is objectionable, as not permitting the pins to rotate in the bearings in the frame in case the brace or breech from any cause should stick to the pins. I have, therefore, devised a plan for securing the pins in place, and at the same time permitting them to rotate upon their axes by means of shoulders formed on or attached to the frame, said shoulders being arranged in such manner as to permit the rotation of the pin in its bearings while holding it firmly in place. The most convenient mode of effecting this purpose is by forming and applying to the frame a button, *t*, the ends *w w* of which are slightly rounded out, concave, and undercut, so that they will cover a small portion of the heads *x x* of the pivot-bolts *h i* and prevent them from dropping out. This button is held in place by a screw, *y*, and when the arm is to be dismembered the screw is turned until the ends of the button will rise and swing over the heads of the pivot-bolts and clear them; and then these bolts can be taken out and the breech-block, brace, and hammer lifted out, cleaned, and laid back, and the pins inserted, and the button turned and the screw *y* run down, and the arm is again ready for use, each part finding its own position, and each spring coming into action without any care, attention, or extra manipulation.

It is evident that the arrangement of the retaining shoulders may be varied without impairing their efficiency, it being only necessary that these shoulders be so arranged as to permit the brace and breech-pins to vibrate with the brace and breech in the use of the arm and be at the same time held in place longitudinally.

Having thus described my invention, what I claim is—

1. In combination with the spring *f*, the abutment 5 on the breech-block, said parts being arranged, substantially as described, whereby the breech-block can be inserted and the spring made to find its proper seat without care or attention of the operator, as set forth.

2. The hammer hung on two centers, *h* and *i*, so that it can move at times on one and at times on the other, as and for the purpose described.

3. The pivot *i* arranged in rear of the vertical plane of the pivot *h*, whereby the action of the mainspring shall force the brace under the breech, substantially as described.

4. In combination with the hammer and the locking-brace, the dog *n*, connected and acting therewith, substantially as and for the purpose set forth.

5. In combination with the breech and locking-brace and their pivot-pins, the retaining-shoulders *w w*, operating as described.

6. The extractor provided with the stem *d* and projection 2, in combination with the breech-block D having a shoulder, 1, formed by cutting a recess in the side of its hub, when arranged to operate substantially as described.

7. The mainspring-stop *k* arranged to hold the spring at such a fixed point as to relieve the hammer from its pressure, whereby the hammer can be removed and replaced without interference from the spring.

JOSEPH RIDER.

Witnesses:
J. B. PELTON,
C. R. DARBY.